(12) United States Patent
Earnest

(10) Patent No.: US 10,828,951 B1
(45) Date of Patent: Nov. 10, 2020

(54) RESILIENT VEHICLE COUPLING ASSEMBLIES

(71) Applicant: Justin W. Earnest, Shreveport, LA (US)

(72) Inventor: Justin W. Earnest, Shreveport, LA (US)

( * ) Notice: Subject to any disclaimer, the term of this patent is extended or adjusted under 35 U.S.C. 154(b) by 109 days.

(21) Appl. No.: 15/898,782

(22) Filed: Feb. 19, 2018

(51) Int. Cl.
*B60D 1/00* (2006.01)
*B60D 1/01* (2006.01)
*E01C 19/48* (2006.01)
*B60D 3/00* (2006.01)

(52) U.S. Cl.
CPC ............... *B60D 1/01* (2013.01); *B60D 3/00* (2013.01); *E01C 19/48* (2013.01); *E01C 2301/08* (2013.01)

(58) Field of Classification Search
CPC ............ B60D 1/01; B60D 1/486; B60D 3/00
USPC ...................... 280/503, 460.1, 486
See application file for complete search history.

(56) References Cited

U.S. PATENT DOCUMENTS

| | | | | |
|---|---|---|---|---|
| 3,175,845 A | * | 3/1965 | McClive | B60D 1/00 280/460.1 |
| 3,199,894 A | * | 8/1965 | McClive | B60D 1/486 280/483 |
| 3,275,342 A | | 9/1966 | Layton | |
| 3,295,866 A | | 1/1967 | Standfuss | |
| 3,300,234 A | | 1/1967 | Layton | |
| 3,304,101 A | | 2/1967 | Layton | |
| 3,338,143 A | | 8/1967 | Layton | |
| 3,396,991 A | | 8/1968 | Schrimper et al. | |
| 3,542,397 A | | 11/1970 | Files | |
| 3,583,728 A | * | 6/1971 | Cornell | B60D 1/00 280/503 |
| 3,990,721 A | | 11/1976 | Hoffman | |
| 5,501,482 A | * | 3/1996 | McClive | B60D 1/00 280/460.1 |
| 2006/0119061 A1 | | 6/2006 | Hudson et al. | |
| 2018/0242509 A1 | * | 8/2018 | Pennybacker | A01B 59/042 |

* cited by examiner

*Primary Examiner* — Tony H Winner
(74) *Attorney, Agent, or Firm* — R. Keith Harrison

(57) ABSTRACT

Vehicle coupling assemblies suitable for facilitating a resilient coupling between a rear vehicle and a vehicle wheel on a front vehicle may include a coupling assembly arm. The coupling assembly arm may be resiliently length-variable responsive to application of a longitudinal extension force on the coupling assembly arm. A wheel engagement member may include an engagement member body rotatably carried by the coupling assembly arm. The engagement member body may be suitably sized and configured for engagement with the vehicle wheel on the front vehicle in substantially concentric relationship with respect to the vehicle wheel.

18 Claims, 9 Drawing Sheets

RESILIENT VEHICLE COUPLING ASSEMBLIES

FIELD

Illustrative embodiments of the disclosure generally relate to couplings and hitches suitable for coupling a rear towed or pushing vehicle to a front towing or pushed vehicle. More particularly, illustrative embodiments of the disclosure relate to resilient vehicle coupling assemblies which are suitable for facilitating a resilient coupling between a rear towed or pushing vehicle such as a paver and a front towing or pushed vehicle such as a paving material supply truck.

BACKGROUND

The background description provided herein is solely for the purpose of generally presenting the context of the illustrative embodiments of the disclosure. Aspects of the background description are neither expressly nor impliedly admitted as prior art against the claimed subject matter.

Hitch couplings are known for coupling a rear towed or pushing vehicle such as a paver to a front towing or pushed vehicle such as a paving material supply truck. Conventional hitch couplings used for the purpose, however, may be rigid and non-resilient. Accordingly, inadvertent sudden slowing or stopping of the paver as the paving material supply truck continues forward travel may result in damage to the hitch coupling and/or to the mounting structures for the hitch coupling on the front vehicle, the rear vehicle, or both.

Therefore, resilient vehicle coupling assemblies which are suitable for facilitating a resilient coupling between a rear towed or pushing vehicle such as a paver and a front towing or pushed vehicle such as a paving material supply truck may be desirable for some applications.

SUMMARY

Illustrative embodiments of the disclosure are generally directed to vehicle coupling assemblies suitable for facilitating a resilient coupling between a rear vehicle and a vehicle wheel on a front vehicle. An illustrative embodiment of the vehicle coupling assemblies may include a coupling assembly arm. The coupling assembly arm may be resiliently length-variable responsive to application of a longitudinal extension force on the coupling assembly arm. A wheel engagement member may include an engagement member body rotatably carried by the coupling assembly arm. The engagement member body of the wheel engagement member may be suitably sized and configured for engagement with the vehicle wheel on the front vehicle in substantially concentric relationship with respect to the vehicle wheel.

BRIEF DESCRIPTION OF THE DRAWINGS

Illustrative embodiments of the disclosure will now be described, by way of example, with reference to the accompanying drawings, in which.

DETAILED DESCRIPTION

Figure 1:
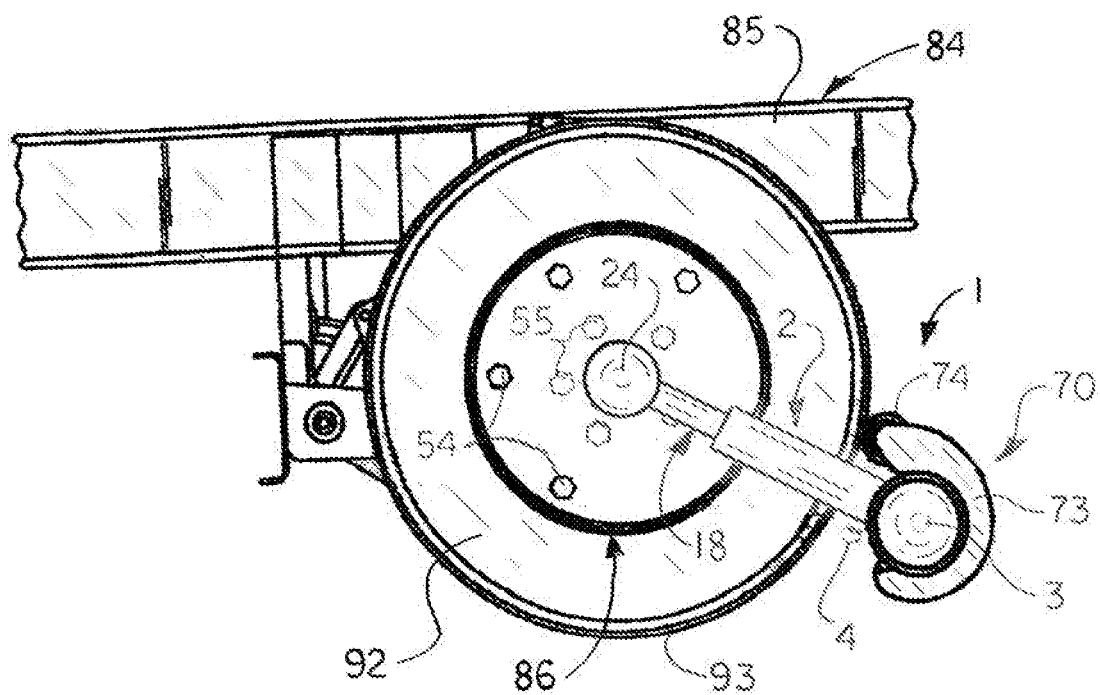
FIG. 1 is a side view of an illustrative embodiment of the resilient vehicle coupling assemblies, coupling a paving material supply truck to a paver (not illustrated) behind the paving material supply truck in typical application of the resilient vehicle coupling assemblies.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIGS. 1 and 8-11 of the drawings, an illustrative embodiment of the vehicle coupling assemblies is generally indicated by reference numeral 1. In some applications, which will be hereinafter described, at least one vehicle coupling assembly 1 may facilitate resilient coupling of a rear towed or pushing vehicle such as a paver 80 (FIGS. 8 and 9) to a front towing or pushed vehicle such as a paving material supply truck 84 (FIG. 1) in road paving applications. In other applications, the vehicle coupling assembly 1 may be amenable to resiliently coupling alternative types of vehicles in a variety of applications.

Figure 8:
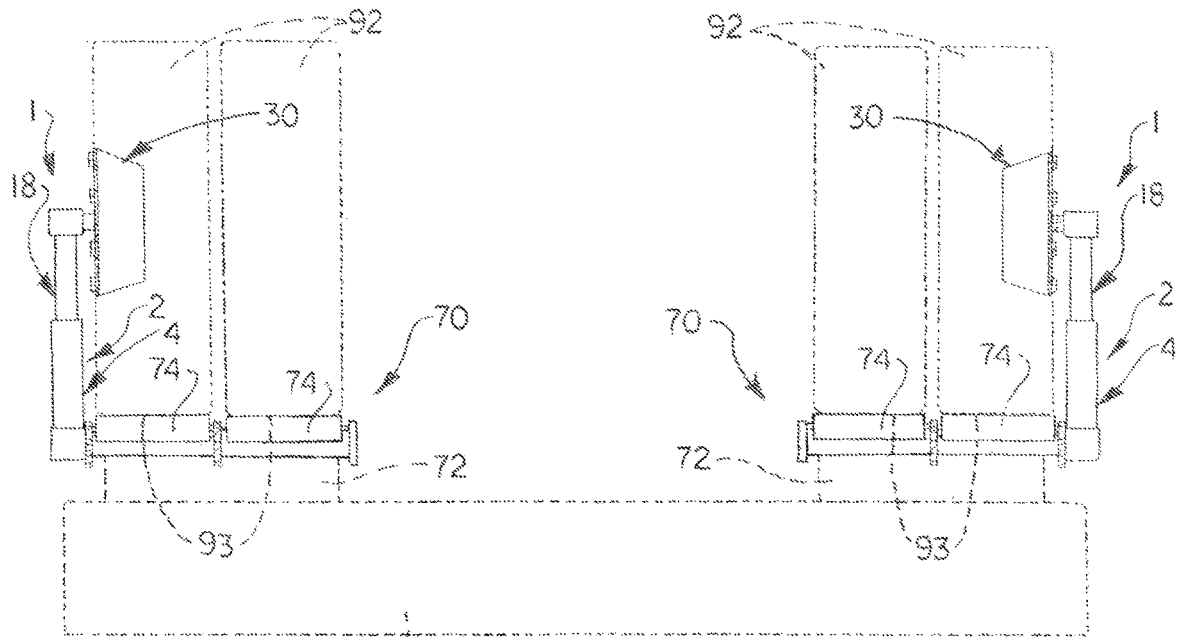
FIG. 8 is a top view of a pair of illustrative resilient vehicle coupling assemblies, coupled to a paver (illustrated in phantom) and to a truck wheel (illustrated in phantom) on a paving material supply truck, with the coupling assembly arms of the respective resilient vehicle coupling assemblies deployed in the retracted position.
Figure 9:
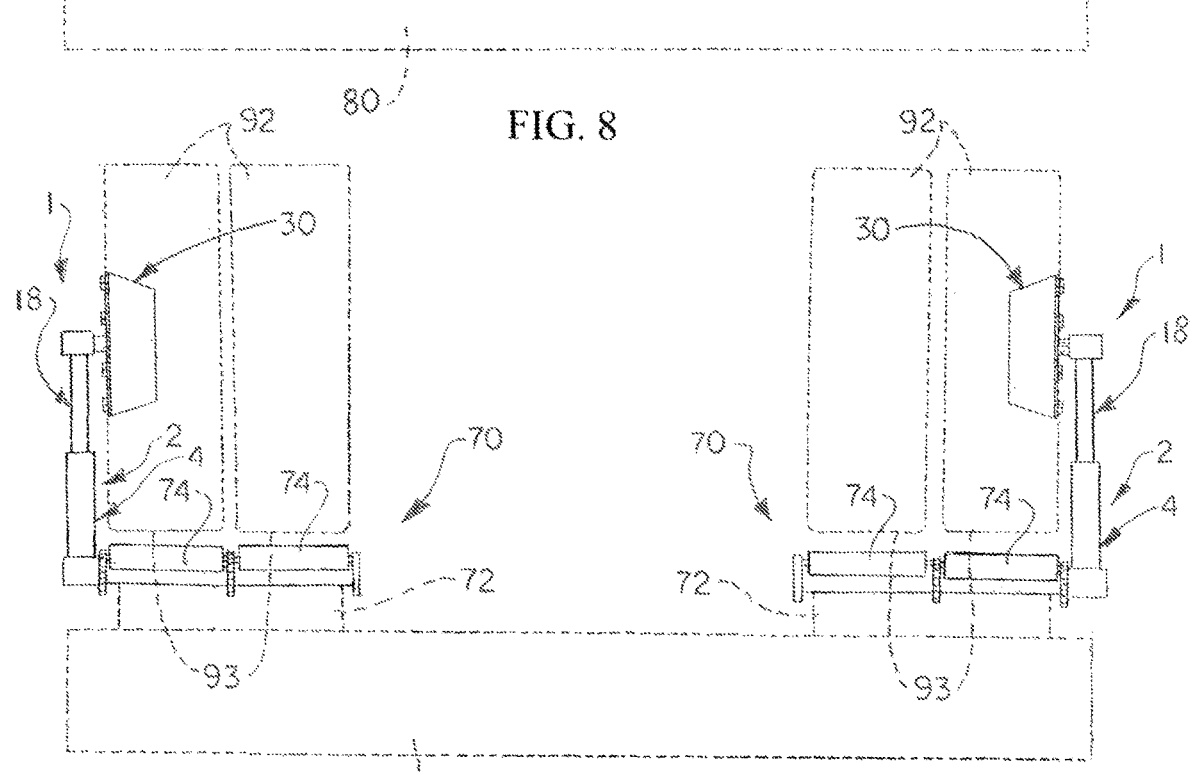
FIG. 9 is a top view of a pair of illustrative resilient vehicle coupling assemblies, coupled to the paver (illustrated in phantom) and to a truck wheel (illustrated in phantom) on the paving material supply truck, with the coupling assembly arms of the respective resilient vehicle coupling assemblies deployed in the extended position responsive to inadvertent stopping or slowing of the paver relative to the paving material supply truck.
Figure 10:
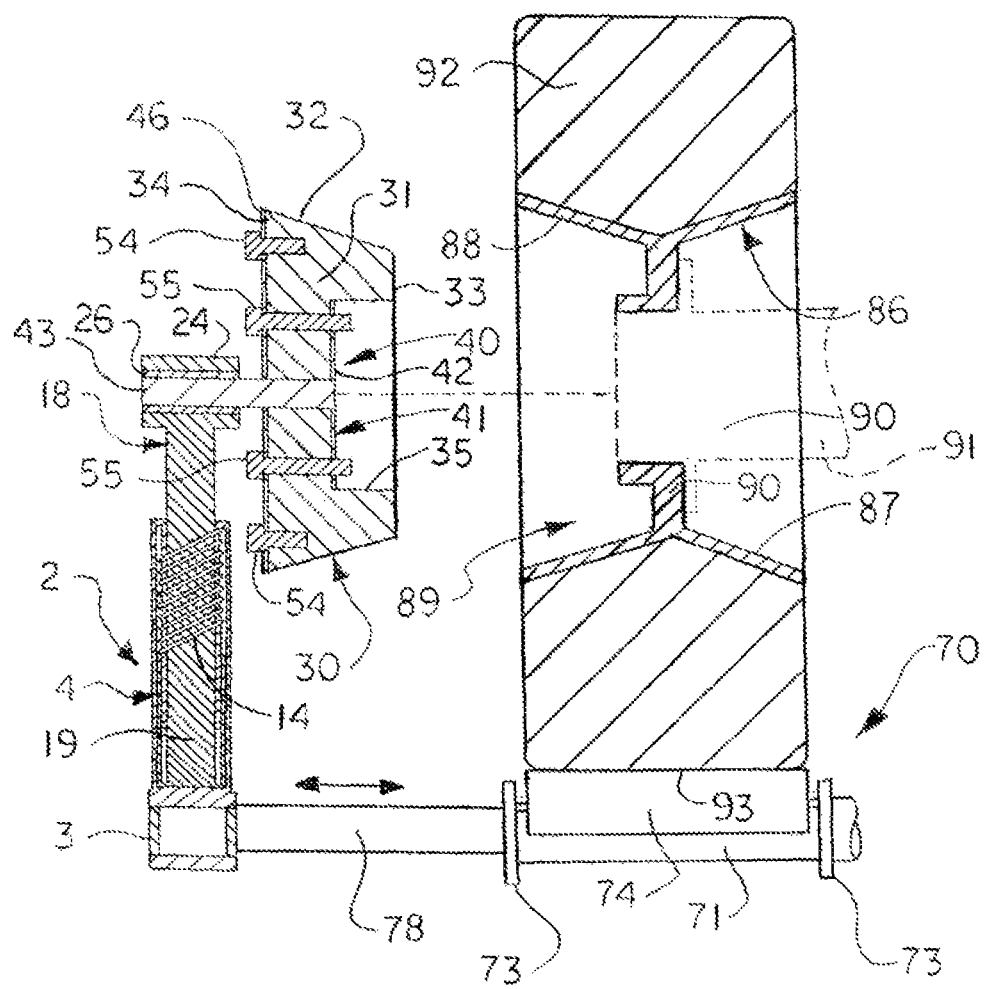
FIG. 10 is a longitudinal sectional view of the illustrative resilient vehicle coupling assembly and truck wheel, with the wheel engagement member of the resilient vehicle coupling assembly disengaged from the truck wheel.
Figure 11:
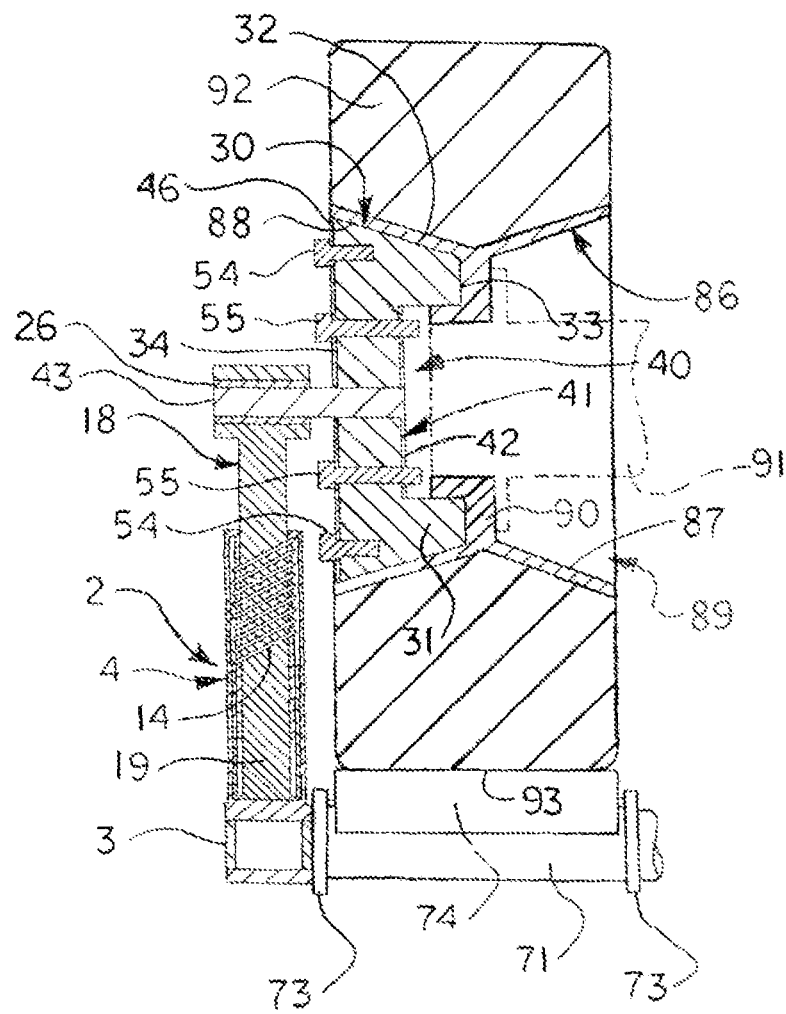
FIG. 11 is a longitudinal sectional view of the illustrative resilient vehicle coupling assembly and truck wheel, with the wheel engagement member of the resilient vehicle coupling assembly disposed in engagement with the truck wheel.

The paver 80 and the paving material supply truck 84 may each be standard or conventional in design. Accordingly, the paver 80 may be self-propelled and steered by tracks (not illustrated). The paver 80 may include a hopper (not illustrated) from which a paving material (not illustrated) such as asphalt is deposited onto a roadway surface to be paved. As illustrated in FIG. 1, the paving material supply truck 84 may have a truck chassis 85. A reclining bed (not illustrated) may be provided on the truck chassis 85. The reclining bed may contain a supply of the paving material and may be operable to dump the paving material into the hopper on the paver 80. The truck chassis 85 of the paving material supply truck 84 may have at least one pair of rear truck wheels 86. As illustrated in FIGS. 10 and 11, each rear truck wheel 86 may include an inboard interior wheel surface 87, an outboard interior wheel surface 88, a wheel interior 89 and a wheel hub 90 which receives a rear axle 91 (illustrated in phantom) of the paving material supply truck 84. In typical road paving applications, at least one vehicle coupling assembly 1 may resiliently couple at least one rear truck wheel 86 of the paving material supply truck 84 to the paver 80. As illustrated in FIGS. 8 and 9, in some applications, a pair of vehicle coupling assemblies 1 may couple the paver 80 to the respective rear truck wheels 86 of the paving material supply truck 84.

Figure 2:
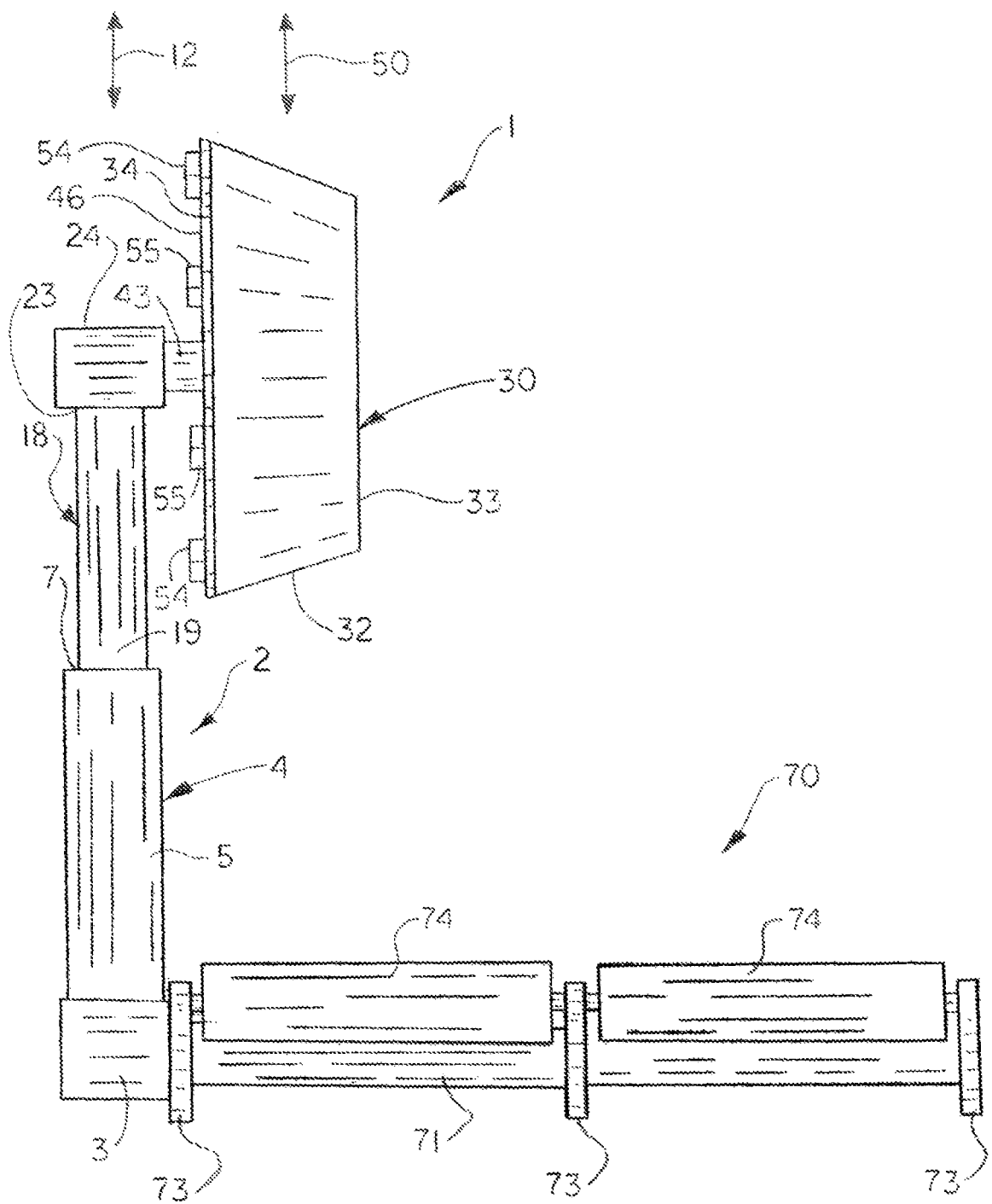
FIG. 2 is a top view of an illustrative embodiment of the resilient vehicle coupling assemblies.

As further illustrated in FIGS. 8 and 9, the vehicle coupling assembly 1 may extend from a truck hitch 70 which may be hitched to the paver 80 using a suitable truck hitch coupling 72 (illustrated in phantom). The truck hitch coupling 72 may include any of a variety of hitch devices or mechanisms known by those skilled in the art and suitable for the purpose and may have a standard or conventional design. As illustrated in FIG. 2, in some embodiments, the truck hitch 70 may include an elongated truck hitch frame 71. At least one pair of spaced-apart roller mount plates 73 may be provided on the truck hitch frame 71. At least one roller 74 may be mounted for rotation between each pair of roller mount plates 73. As illustrated in FIG. 8, during operation of the paver 80, each roller 74 may engage the tread surface 93 on a tire 92 on the corresponding rear truck wheel 86 (FIGS. 10 and 11) of the paving material supply truck 84 as the paver 80 typically pushes the paving material supply truck 84 along the roadway surface being paved.

A coupling assembly arm 2 may extend forwardly from the truck hitch 70. A rotatable wheel engagement member 30 may be provided on the coupling assembly arm 2. The wheel engagement member 30 may be suitably sized and configured to insert into the wheel interior 89 (FIGS. 10 and 11) and simultaneously engage substantially the entire circumference of the outboard interior wheel surface 88 (FIGS. 10 and 11) of the rear truck wheel 86 on the paving material supply truck 84. Thus, the wheel engagement member 30 may achieve secure and substantially immovable engagement of the vehicle coupling assembly 1 with the rear truck wheel 86.

The length of the coupling assembly arm 2 may be resiliently variable responsive to application of longitudinal extension forces on the coupling assembly arm 2. Accordingly, the vehicle coupling assembly 1 may facilitate resilient and yet secure and immovable coupling between the paving material supply truck 84 and the paver 80 to accommodate sudden movement and changes in the distance between the paving material supply truck 84 and the paver 80 during road paving operations. This expedient may prevent or minimize damage to the vehicle coupling assembly 1 as well as to the trailer hitch coupling 72 and/or other mounting structures for the vehicle coupling assembly 1.

Referring next to FIGS. 2-5, 10 and 11 of the drawings, in some embodiments, the coupling assembly arm 2 of the vehicle coupling assembly 1 may include an arm base 3. The arm base 3 may be attached or coupled to the truck hitch 70 via mechanical fasteners, welded, or cast or molded in one piece with the truck hitch 70 according to the knowledge of those skilled in the art. As illustrated in FIG. 10, an elongated arm mount member 78 may telescopically engage the truck hitch frame 71 of the truck hitch 70. The arm base 3 of the coupling assembly arm 2 may be welded, fabricated in one piece with and/or mechanically fastened to the arm mount member 78 according to the knowledge of those skilled in the art.

Figure 3:
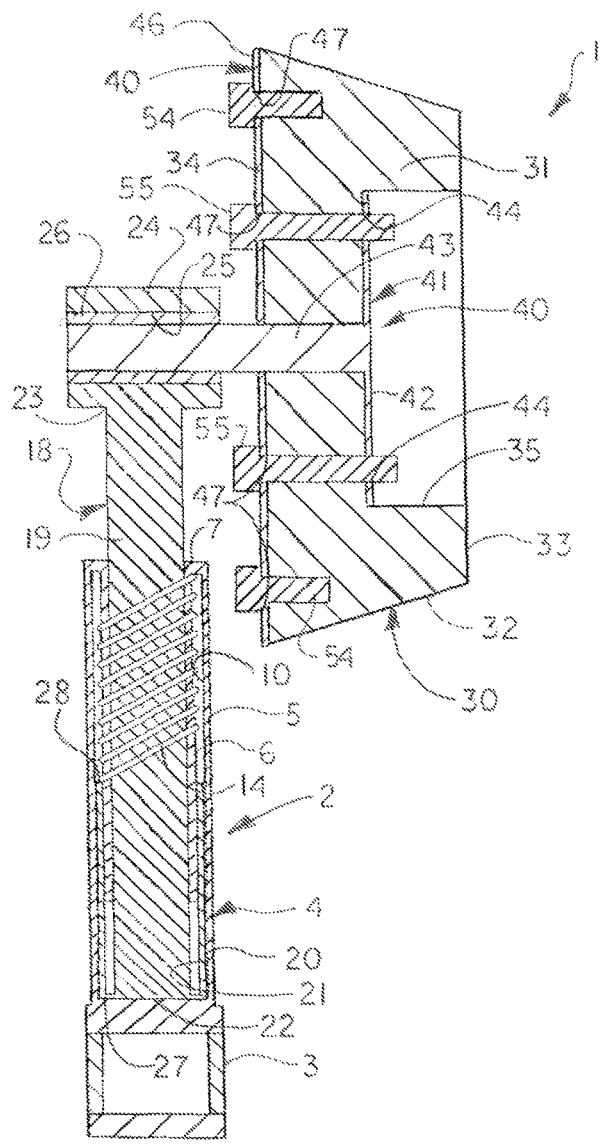
FIG. 3 is a longitudinal sectional view of an illustrative resilient vehicle coupling assembly, with the coupling assembly arm deployed in a retracted position.
Figure 4:
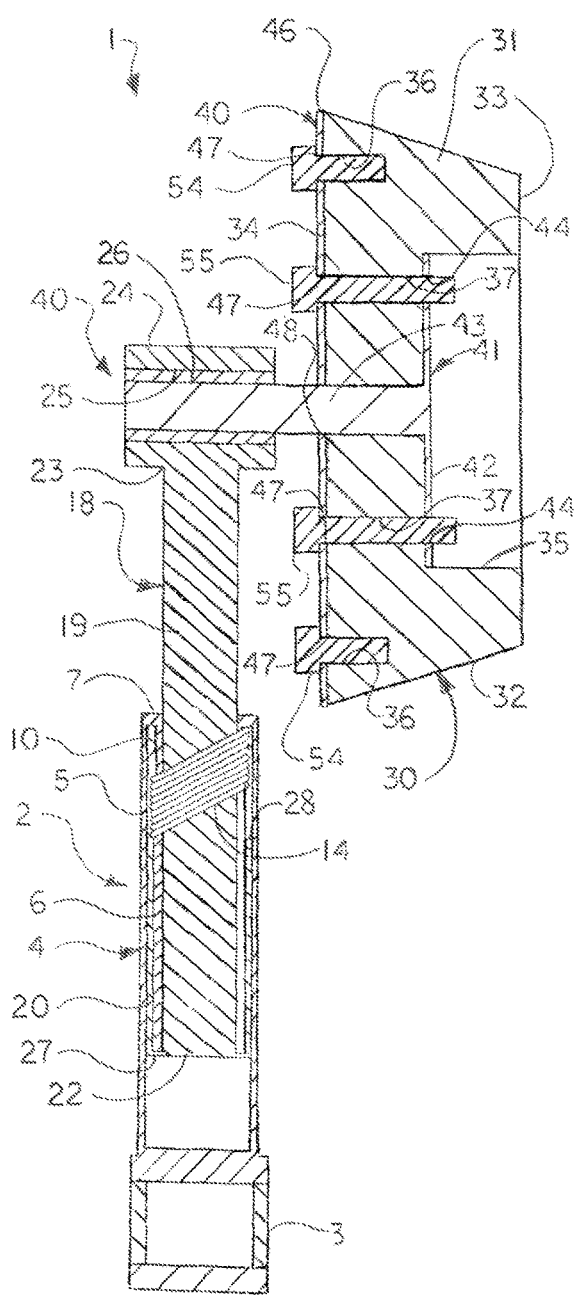
FIG. 4 is a longitudinal sectional view of an illustrative resilient vehicle coupling assembly, with the coupling assembly arm deployed in an extended position.
Figure 5:
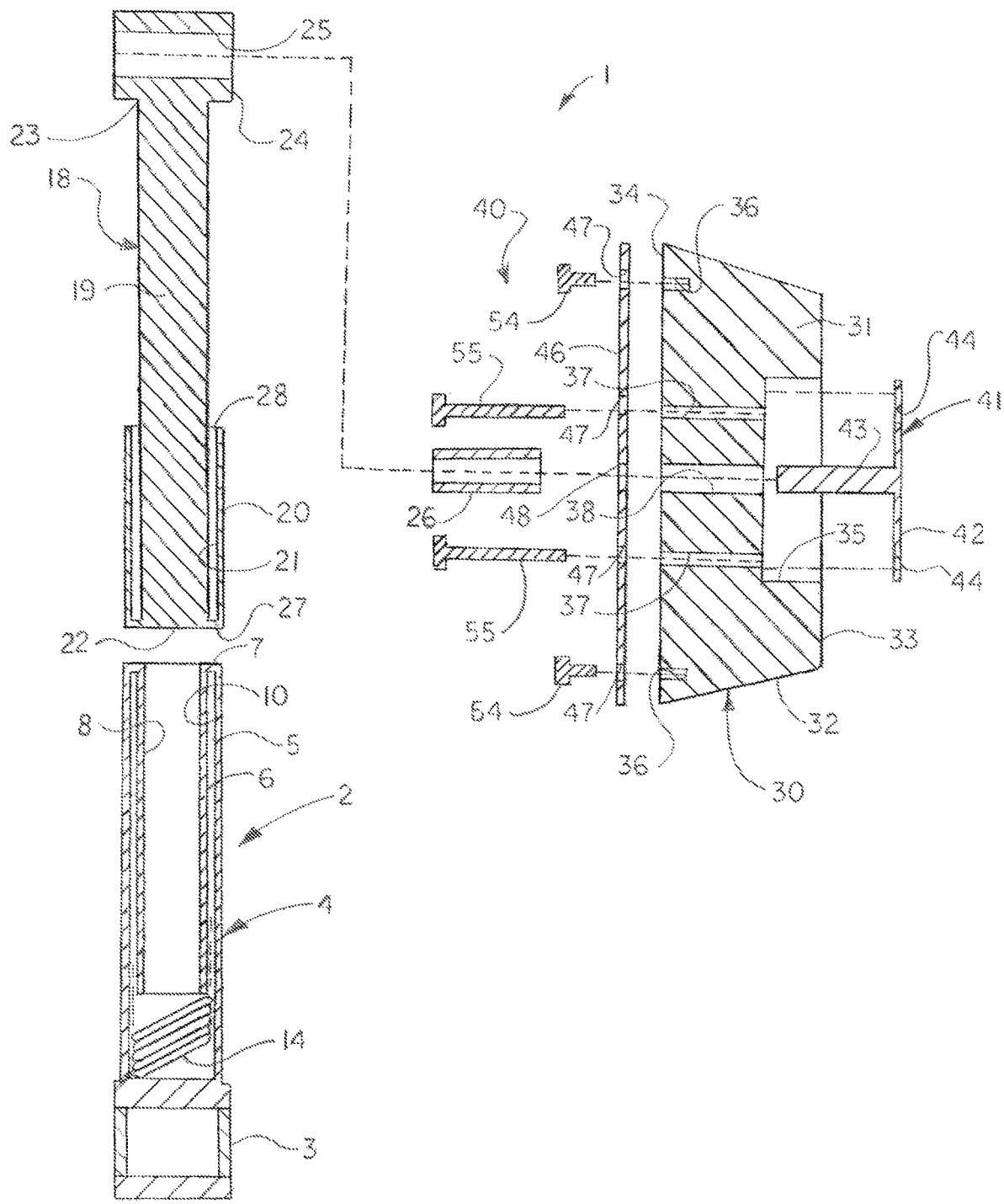
FIG. 5 is an exploded longitudinal sectional view of an illustrative resilient vehicle coupling assembly.

As illustrated in FIGS. 3-5, an elongated arm housing 4 may extend from the arm base 3. The arm housing 4 may include an outer wall portion 5. An inner wall portion 6 may be disposed in parallel, spaced-apart relationship to the outer wall portion 5. A connecting wall portion 7 may extend between the outer wall portion 5 and the inner wall portion 6. As illustrated in FIG. 5, a housing interior 8 may be formed by and within the inner wall portion 6. The inner wall portion 8 may terminate in spaced-apart relationship to the arm base 3. A spring space 10 may be formed by and between the interior surface of the outer wall portion 5 and the exterior surface of the inner wall portion 6. A coiled arm spring 14 may be disposed within the spring space 10 for purposes which will be hereinafter described.

An arm member 18 may be telescopically extendable from the housing interior 8 of the arm housing 4. As illustrated in FIG. 5, the arm member 18 may include an elongated arm member shaft 19. The arm member shaft 19 may have a proximal shaft end 22 and a distal shaft end 23. An arm member wall 20 may extend from the proximal shaft end 22 of the arm member shaft 19 in parallel, spaced-apart relationship to the arm member shaft 19. A wall space 21 may be formed by and between the arm member shaft 19 and the arm member wall 20. The arm member wall 20 may have a proximal wall end 27 which extends from the proximal shaft end 22 of the arm member shaft 19 and a distal wall end 28 which terminates opposite the proximal wall end 27.

As illustrated in FIGS. 3 and 4, the arm member wall 20 on the arm member shaft 19 of the arm member 18 may insert into the spring space 10 between the outer wall portion 5 and the inner wall portion 6 of the arm housing 4. The arm spring 14 may be sandwiched between the connecting arm portion 7 of the arm housing 4 and the distal wall end 28 of the arm member wall 20 on the arm member 18. Accordingly, as illustrated in FIG. 3, the arm spring 14 may normally bias the arm member 18 in a telescopically-retracted position in the arm housing 4. In the retracted position of the hitch assembly arm 2, the arm spring 14 may bias the proximal shaft end 22 on the arm member shaft 19 of the arm member 18 into engagement with the arm base 3. As illustrated in FIG. 4, responsive to application of a longitudinally-directed extension force to the coupling assembly arm 2, such as may occur in the event that the distance between the paver 80 and the paving material supply truck 84 suddenly increases during a paving operation, the arm member wall 20 may slide distally within the spring space 10 toward the connecting wall portion 7 of the arm housing 4 as the arm member 18 telescopically extends from the housing interior 8 of the arm housing 4. Thus, the arm spring 14 may be compressed between the distal wall end 28 of the arm member wall 20 and the connecting wall portion 7 of the arm housing 4.

The wheel engagement member 30 of the vehicle coupling assembly 1 may be provided at the distal shaft end 23 of the arm member shaft 19 of the arm member 18. As illustrated in FIG. 2, the wheel engagement member 30 may lie within a plane 50 which is oriented in substantially parallel relationship to a longitudinal arm axis 12 of the coupling assembly arm 2. As illustrated in FIGS. 3-5, the wheel engagement member 30 may include an engagement member body 31 which may be circular and substantially concentric with the rear truck wheel 86. The engagement member body 31 of the wheel engagement member 30 may be fabricated of rubber, plastic, composite material and/or other material or materials which is/are suitable to achieve a snug fit against substantially the entire circumference of the outboard interior wheel surface 88 (FIGS. 10 and 11) of the rear truck wheel 86. The engagement member body 31 may have a size which substantially corresponds to or is slightly smaller than the entire volume of the wheel interior 89 at the outboard interior wheel surface 88 of the rear truck wheel 86. Accordingly, as illustrated in FIG. 11, the engagement member body 31 may be suitably sized and configured to simultaneously engage substantially the entire circumference of the outboard interior wheel surface 88 of the rear truck wheel 86.

The engagement member body 31 of the wheel engagement member 30 may have an inner engagement member surface 33 and an outer engagement member surface 34. The inner engagement member surface 33 and the outer engagement member surface 34 may each be planar and may be disposed in parallel and spaced-part relationship to each other. The diameters of the inner wheel engagement member surface 33 and the outer wheel engagement member surface 34 of the engagement member body 31 may vary depending on the diameter and dimensions of the rear truck wheel 86 of the paving material supply truck 84. For example and without limitation, in some non-limiting embodiments, the outer wheel engagement member surface 34 may have a diameter of about 12 inches.

A side engagement member surface 32 may extend from the inner engagement member surface 33 to the outer engagement member surface 34. The side engagement member surface 32 may have a cross-sectional contour or profile which substantially matches the cross-sectional contour or profile of the outboard interior wheel surface 88 (FIGS. 10 and 11) of the rear truck wheel 86. In some embodiments, the side engagement member surface 32 may have a beveled cross-sectional contour or profile and may taper from the outer engagement member surface 34 to the inner engagement member surface 33 to substantially match the likewise beveled cross-sectional contour or profile of the outboard interior wheel surface 88 of the rear truck wheel 88, as illustrated. In some embodiments, creases and/or ridges (not illustrated) may be provided in the side engagement member surface 32 to substantially match the corresponding ridges and/or creases, respectively, in the cross-sectional contour or profile of the outboard interior wheel surface 88.

In some embodiments, a wheel hub cavity 35 may extend from the inner engagement member surface 33 into the engagement member body 31. As illustrated in FIG. 11, to facilitate engagement of the wheel engagement member 30 with the rear truck wheel 86, the wheel hub cavity 35 may be suitably sized and configured to accommodate at least a portion of the wheel hub 90 in the wheel interior 89 of the rear truck wheel 86. As illustrated in FIG. 5, a central hub shaft opening 38 may extend through the engagement member body 31 from the outer engagement member surface 34 to the wheel hub cavity 35. Multiple outer fastener openings 36 may extend into the outer engagement member surface 34 adjacent to the side engagement member surface 32. Multiple inner fastener openings 37 may extend through the engagement member body 31 from the outer engagement member surface 34 to the wheel hub cavity 35 for purposes which will be hereinafter described.

The wheel engagement member 30 may be rotatably attached the arm member shaft 19 of the arm member 18 according to any suitable attachment method or technique which is known by those skilled in the art. Accordingly, in some embodiments, an engagement member coupling assembly 40 may include an arm member coupling 24 which terminates the distal shaft end 23 of the arm member shaft 19 of the arm member 18 on the coupling assembly arm 2. A coupling bore 25 may extend through the arm member coupling 24. A bushing 26 may be disposed in the coupling bore 25.

A coupling hub 41 may include a hub plate 42. A hub shaft 43 may extend from the hub plate 42. The hub shaft 43 may extend through the hub shaft opening 38 as the hub plate 42 seats in the wheel hub cavity 35 in the engagement member body 31. A coupling plate 46 may engage the outer engagement member surface 34 of the engagement member body 31. The hub shaft 43 of the coupling hub 41 may extend through a central coupling shaft opening 48 in the coupling plate 46 and into the registering bushing 26 in the coupling bore 25 of the arm member coupling 24. In some embodiments, a shaft flange (not illustrated) may terminate the hub shaft 43 to retain the hub shaft 43 in the bushing 26. Outer plate fasteners 54 may be extended through respective fastener openings 47 in the coupling plate 46 and threaded into the registering outer fastener openings 36 in the engagement member body 31. In like manner, inner plate fasteners 55 may be extended through respective fastener openings 47 in the coupling plate 46 and threaded into the registering inner fastener openings 37 in the engagement member body 31. The inner plate fasteners 55 may also extend through registering fastener openings 44 in the hub plate 42 of the coupling hub 41. Accordingly, the coupling hub 41 and coupling plate 46 of the engagement member coupling assembly 40 may secure the wheel engagement member 30 on the coupling assembly arm 2. Alternative methods and techniques known by those skilled in the art may be used to rotatably mount the wheel engagement member 30 on the arm member 18 of the hitch assembly arm 2.

Referring again to FIGS. 1 and 8-11 of the drawings, in typical application, at least one vehicle coupling assembly 1 may be coupled to the paver 80 typically via the truck hitch coupling 72 (FIGS. 8 and 9) and deployed to engage at least one rear truck wheel 86 on the paving material supply truck 84 in road paving operations. Accordingly, as illustrated in FIG. 10, the arm mount member 78 may be extended from the truck hitch frame 71 of the truck hitch 70. The position of the paver 80 may be adjusted until the wheel engagement member 30 aligns or registers with the wheel interior 89 of the corresponding rear truck wheel 86 on the paving material supply truck 84. The arm mount member 78 may next be retracted into the truck hitch frame 71 as the wheel engagement member 30 inserts into the wheel interior 89 and the side engagement member surface 32 simultaneously engages substantially the entire circumference of the outboard interior wheel surface 88 of the rear truck wheel 86. The wheel hub cavity 35 in the engagement member body 31 of the wheel engagement member 30 may simultaneously receive the wheel hub 90 of the rear truck wheel 86. As illustrated in FIG. 11, the engagement member body 31 of the wheel engagement member 30 may substantially fill the volume of the wheel interior 89 such that the side engagement member surface 32 and inner engagement member surface 33 on the engagement member body 31 may engage substantially the entire circumference of the outboard interior wheel surface 88. The wheel engagement member 30 may rotate with the rear truck wheel 86 to facilitate secure and immovable coupling between the paving material supply truck 84 and the paver 80 as the paver 80 typically pushes the paving material supply truck 84 on the roadway surface being paved. A paving material (not illustrated) may be placed in the reclining bed (not illustrated) on the paving material supply truck 84 and dumped from the reclining bed into the hopper (not illustrated) on the paver 80. The paving material may then be deposited from the hopper onto the roadway surface to be paved. Therefore, the wheel engagement member 30 may facilitate resilient and yet secure and immovable coupling between the paving material supply truck 84 and the paver 80.

Throughout the paving operation, the paver 80 may push the paving material supply truck 84 along the roadway surface which is being paved. The arm spring 14 may normally maintain the arm member 18 in the retracted position in the arm housing 4 of the coupling assembly arm 2, as illustrated in FIGS. 3 and 8, such that the proximal shaft end 22 on the arm member shaft 19 of the arm member 18 typically remains in engagement with the arm base 3 of the coupling assembly arm 2. The arm spring 14 may resiliently absorb minor increases in the distance between the paving material supply truck 84 and the paver 80. In the event that the paver 80 inadvertently and suddenly slows or stops as the paving material supply truck 84 continues forward travel, such as in the event that the paving material supply truck 84 rolls ahead of the paver 80 or the paver 80 stops or operates in reverse, the tires 92 on the rear truck wheels 86 may disengage the respective rollers 74 on the truck hitch 70, as illustrated in FIG. 9. Simultaneously, the arm member 18 may be pulled and extended from the coupling assembly arm 2 against the bias imparted by the arm spring 14, as illustrated in FIG. 4. Thus, the arm spring 14 may resiliently absorb the axial or linear extension forces which are applied to the coupling assembly arm 2 along the longitudinal arm axis 12 (FIG. 2) to accommodate the sudden movement and increase in the distance between the paving material supply truck 84 and the paver 80. This expedient may prevent or minimize damage to the vehicle coupling assembly 1 as well as the truck hitch 70, the trailer hitch coupling 72 and/or other mounting structures for the vehicle coupling assembly 1.

At the conclusion of the paving operation, the paving material supply truck 84 may be uncoupled from the paver 80 typically by disengaging the wheel engagement member 30 of the vehicle coupling assembly 1 from the rear truck wheel 86. In some embodiments, this may be accomplished by extension of the arm mount member 78 from the truck hitch frame 71 of the truck hitch 70, as illustrated in FIG. 10. The truck hitch 70 may be uncoupled from the paver 80 by disengagement of the truck hitch coupling 72 as is known by those skilled in the art.

Figures 6, 7:
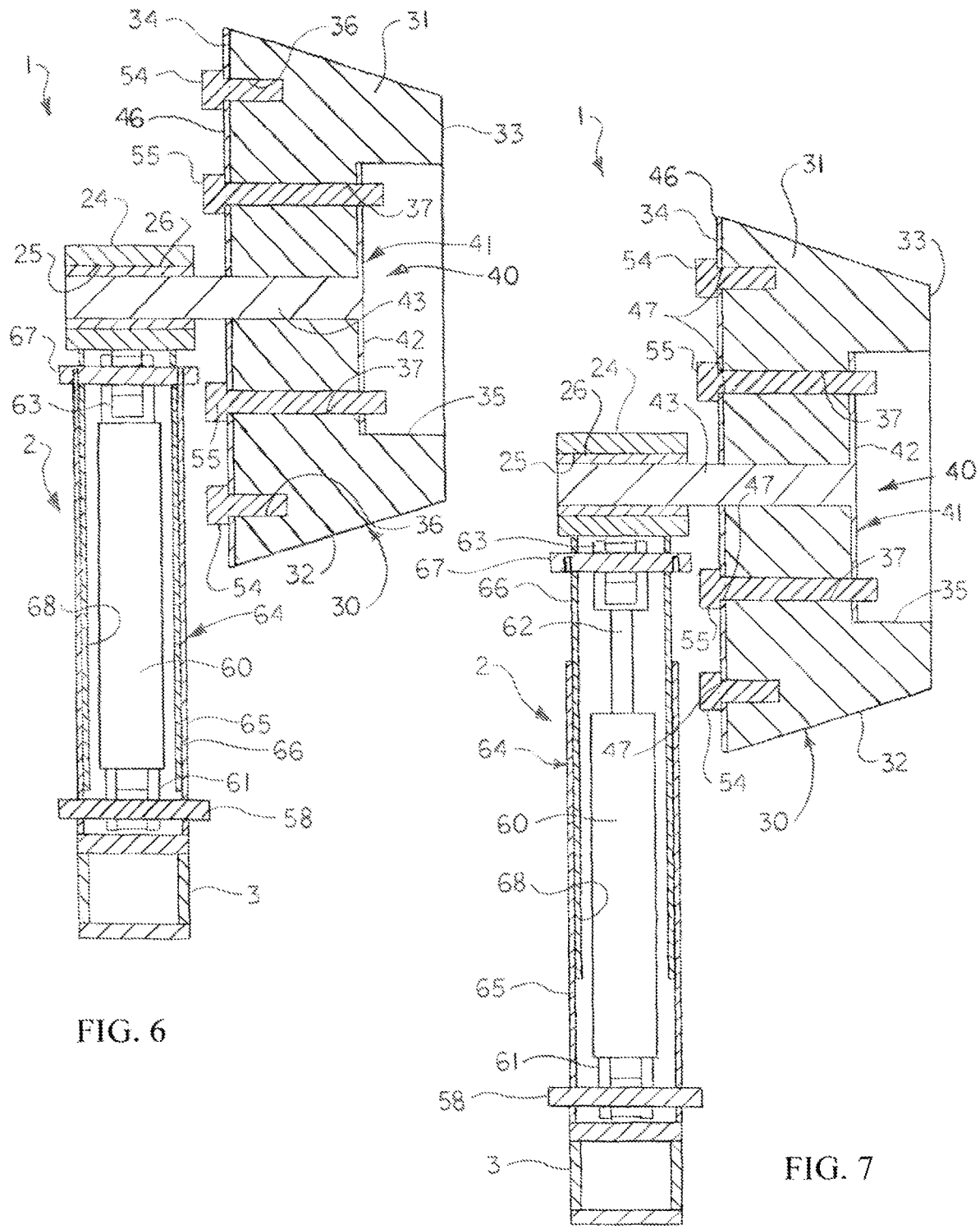
FIG. 6 is a longitudinal sectional view of an alternative illustrative embodiment of the resilient vehicle coupling assemblies, with the coupling assembly arm deployed in a retracted position.
FIG. 7 is a longitudinal sectional view of the illustrative resilient vehicle coupling assembly illustrated in FIG. 6, with the coupling assembly arm deployed in an extended position.

Referring next to FIGS. 6 and 7 of the drawings, in some embodiments, the coupling assembly arm 2 of the vehicle coupling assembly 1 may include an arm housing 64 having an outer housing wall 65. An inner housing wall 66 may be telescopically extendable from the outer housing wall 65. The arm housing 64 may have a housing interior 68. A cylinder mount member 58 may be provided on the outer housing wall 65 in the housing interior 68. A piston mount member 67 may be provided on the inner housing wall 66 in the housing interior 68. A fluid-containing arm cylinder 60 may have a cylinder mount flange 61 which may be mounted on the cylinder mount member 58 in the housing interior 68 of the arm housing 64. An arm piston 62 (FIG. 7) may be extendable from the arm cylinder 60. The arm piston 62 may have a piston flange 63 which may be attached to the piston mount member 67. Accordingly, the coupling assembly arm 2 may resiliently absorb both minor and major increases in the distance between the paving material supply truck 84 and the paver 80 during road paving operations as the cylinder piston 62 extends from and retracts into the arm cylinder 60. This expedient may prevent or minimize damage to the vehicle coupling assembly 1 as well as to the trailer hitch coupling 72 and/or other mounting structures for the vehicle coupling assembly 1.

Figure 12:
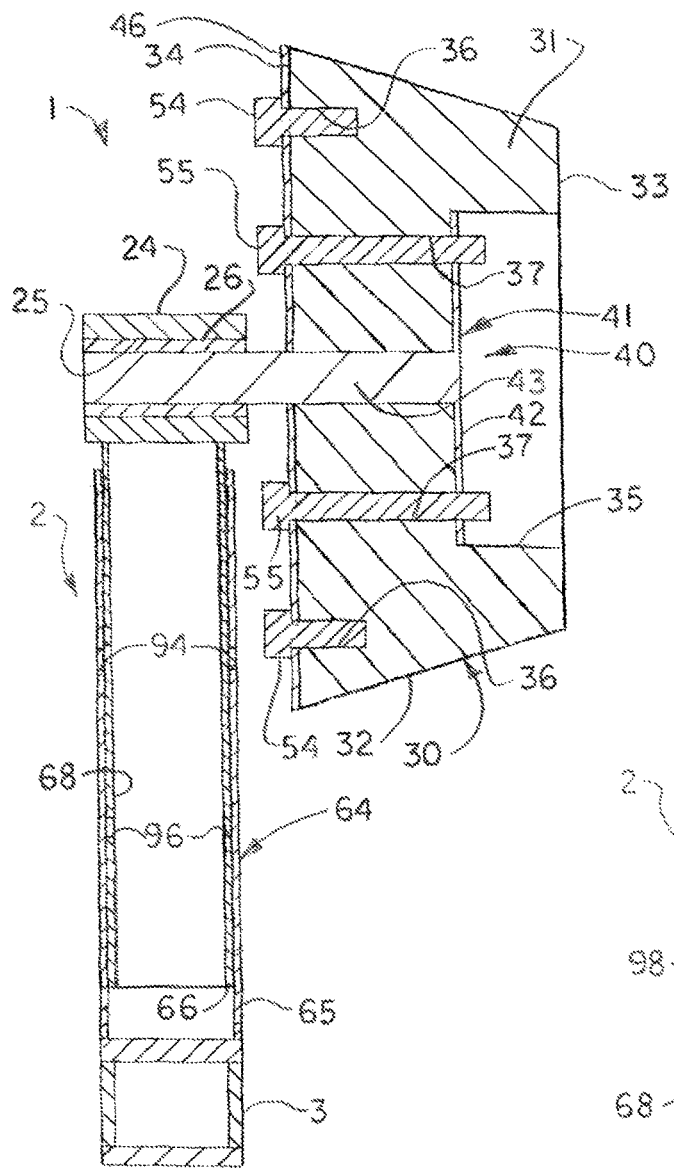
FIG. 12 is a longitudinal sectional view of another alternative embodiment of the resilient vehicle coupling assemblies, with the coupling assembly arm deployed in a retracted position.
Figure 13:
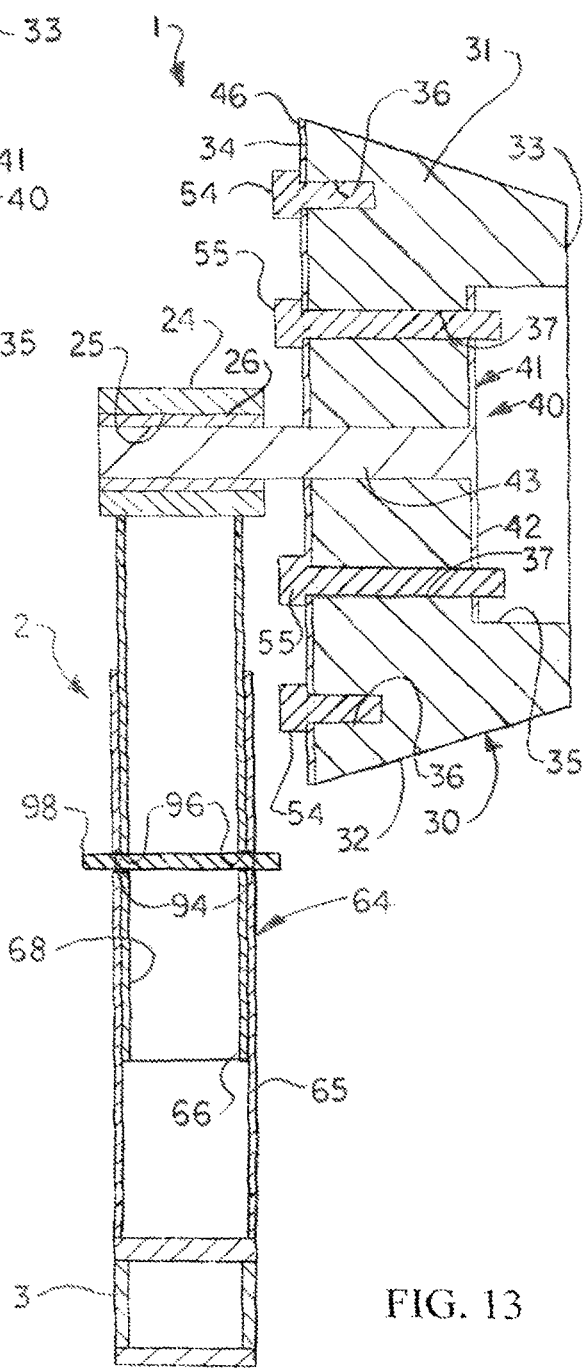
FIG. 13 is a longitudinal sectional view of the illustrative resilient vehicle coupling assembly illustrated in FIG. 12, with the coupling assembly arm deployed in an extended position.

Referring next to FIGS. 12 and 13 of the drawings, in some embodiments of the vehicle coupling assembly 1, at least one pair of aligned outer arm pin openings 94 may be provided in the outer housing wall 65 of the arm housing 64. A pair of aligned inner arm pin openings 96 may be provided in the inner housing wall 66 of the arm housing 64. As illustrated in FIG. 13, a frangible arm retainer pin 98 may extend through the outer arm pin openings 94 and registering inner arm pin openings 96 to normally retain the arm housing 64 in the extended position throughout the road paving operation. In the event that sudden movement and increase in the distance between the paving material supply truck 84 and the paver 80 occurs during the road paving operation, extension forces may be applied to the arm housing 64. Thus, the inner housing wall 66 may slide with respect to the outer housing wall 65 as the arm retainer pin 98 is sheared and the arm housing 64 assumes the retracted position illustrated in FIG. 12. Accordingly, shearing of the arm retainer pin 98 to enable sliding of the inner housing wall 66 relative to the outer housing wall 65 may prevent or minimize damage to the vehicle coupling assembly 1 as well as the trailer hitch coupling 72 and/or other mounting structures for the vehicle coupling assembly 1.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A vehicle coupling assembly for facilitating a resilient coupling between a rear vehicle and a vehicle wheel on a front vehicle, comprising:

a coupling assembly arm;
a wheel engagement member including an engagement member body rotatably carried by the coupling assembly arm, the engagement member body suitably sized and configured for engagement with the vehicle wheel on the front vehicle in substantially concentric relationship with respect to the vehicle wheel;
wherein the coupling assembly arm is resiliently length-variable responsive to application of a longitudinal extension force on the coupling assembly arm; and
wherein the coupling assembly arm comprises an arm base, an arm housing extending from the arm base, an arm member telescopically extendable from the arm housing and an arm spring sandwiched between the arm housing and the arm member, the arm spring normally biases the arm member in a retracted position in the arm housing.

2. The vehicle coupling assembly of claim 1 wherein the engagement member body of the wheel engagement member comprises an outer engagement member surface, an inner engagement member surface and a side engagement member surface extending from the outer engagement member surface to the inner engagement member surface.

3. The vehicle coupling assembly of claim 2 wherein the wheel engagement member lies within a plane oriented in substantially parallel relationship to a longitudinal arm axis of the coupling assembly arm.

4. The vehicle coupling assembly of claim 1 wherein the arm housing comprises an outer wall portion; an inner wall portion disposed in parallel, spaced-apart relationship to the outer wall portion, the inner wall portion terminating in spaced-apart relationship to the arm base; a connecting wall portion extending between the outer wall portion and the inner wall portion; a housing interior formed by and within the inner wall portion; and a spring space formed by and between the outer wall portion and the inner wall portion, the arm spring disposed within the spring space.

5. The vehicle coupling assembly of claim 4 wherein the arm member comprises an elongated arm member shaft having a proximal shaft end and a distal shaft end; an arm member wall extending from the proximal shaft end in parallel, spaced-apart relationship to the arm member shaft, the arm member wall having a proximal wall end extending from the proximal shaft end of the arm member shaft and a distal wall end terminating opposite the proximal wall end; and a wall space formed by and between the arm member shaft and the arm member wall, the arm member wall inserts into the spring space of the arm housing.

6. The vehicle coupling assembly of claim 1 wherein the engagement member body of the wheel engagement member is circular.

7. A vehicle coupling assembly for facilitating a resilient coupling between a rear vehicle and a rear vehicle wheel having a wheel interior and an outboard interior wheel surface on a front vehicle, comprising:
a truck hitch configured for coupling to the rear vehicle;
a coupling assembly arm carried by the truck hitch, the coupling assembly arm is resiliently length-variable responsive to application of a longitudinal extension force on the coupling assembly arm; and
a wheel engagement member including a circular engagement member body rotatably carried by the coupling assembly arm, the engagement member body suitably sized and configured to insert into the wheel interior and simultaneously engage substantially an entire circumference of the outboard interior wheel surface of the rear vehicle wheel on the front vehicle in substantially concentric relationship with respect to the rear vehicle wheel, the wheel engagement member body including:
an outer engagement member surface;
an inner engagement member surface; and
a side engagement member surface extending from the outer engagement member surface to the inner engagement member surface, the side engagement member surface having a beveled cross-sectional profile and tapering from the outer engagement member surface to the inner engagement member surface.

8. The vehicle coupling assembly of claim 7 wherein the coupling assembly arm comprises an arm housing having an outer housing wall, an inner housing wall telescopically extendable from the outer housing wall, an arm cylinder in the arm housing and an arm piston extendable from the arm cylinder and engaging the inner housing wall, the wheel engagement member carried by the inner housing wall.

9. The vehicle coupling assembly of claim 7 wherein the coupling assembly arm comprises an arm housing having an outer housing wall, an inner housing wall telescopically extendable from the outer housing wall, at least one pair of aligned outer arm pin openings in the outer housing wall, a pair of aligned inner arm pin openings in the inner housing wall and a frangible arm retainer pin extending through the outer arm pin openings and inner arm pin openings to normally retain the arm housing in an extended position with respect to the arm housing.

10. The vehicle coupling assembly of claim 7 further comprising a wheel hub cavity in the inner engagement member surface of the engagement member body.

11. A vehicle coupling assembly for facilitating a resilient coupling between a rear vehicle and a rear vehicle wheel having a wheel interior and an outboard interior wheel surface on a front vehicle, comprising:
a truck hitch configured for coupling to the rear vehicle;
a coupling assembly arm, the coupling assembly arm is resiliently length-variable responsive to application of a longitudinal extension force on the coupling assembly arm, the coupling assembly arm including:
an arm base carried by the truck hitch;
an arm housing extending from the arm base, the arm housing including:
an outer wall portion;
an inner wall portion disposed in parallel, spaced-apart relationship to the outer wall portion, the inner wall portion terminating in spaced-apart relationship to the arm base;
a connecting wall portion extending between the outer wall portion and the inner wall portion;
a housing interior formed by and within the inner wall portion; and
a spring space formed by and between the outer wall portion and the inner wall portion;
an arm member telescopically extendable from the arm housing, the arm member including:
an elongated arm member shaft having a proximal shaft end and a distal shaft end;
an arm member wall extending from the proximal shaft end in parallel, spaced-apart relationship to the arm member shaft, the arm member wall having a proximal wall end extending from the proximal shaft end of the arm member shaft and a distal wall end terminating opposite the proximal wall end; and a wall space formed by and between the arm member shaft and the arm member wall, the arm member wall, the arm member wall inserts into the spring space of the arm housing;

an arm spring disposed in the spring space of the arm housing and sandwiched between the connecting arm portion of the arm housing and the distal wall end on the arm member wall of the arm member, the arm spring normally biases the arm member in a retracted position in the arm housing; and a wheel engagement member including a circular engagement member body rotatably carried by the arm member shaft of the coupling assembly arm, the engagement member body suitably sized and configured to insert into the wheel interior and simultaneously engage substantially an entire circumference of the outboard interior wheel surface of the rear vehicle wheel on the front vehicle in substantially concentric relationship with respect to the rear vehicle wheel, the wheel engagement member body including:

an outer engagement member surface;

an inner engagement member surface; and a side engagement member surface extending from the outer engagement member surface to the inner engagement member surface, the side engagement member surface having a beveled cross-sectional profile and tapering from the outer engagement member surface to the inner engagement member surface.

12. The vehicle coupling assembly of claim 11 wherein the side engagement member surface of the engagement member body has a beveled cross-sectional contour or profile and tapers from the outer engagement member surface to the inner engagement member surface.

13. The vehicle coupling assembly of claim 11 further comprising a wheel hub cavity in the inner engagement member surface of the engagement member body.

14. The vehicle coupling assembly of claim 11 wherein the wheel engagement member lies within a plane oriented in substantially parallel relationship to a longitudinal arm axis of the coupling assembly arm.

15. A vehicle coupling assembly for facilitating a resilient coupling between a rear vehicle and a vehicle wheel on a front vehicle, comprising:

a coupling assembly arm;

a wheel engagement member including an engagement member body rotatably carried by the coupling assembly arm, the engagement member body suitably sized and configured for engagement with the vehicle wheel on the front vehicle in substantially concentric relationship with respect to the vehicle wheel;

wherein the coupling assembly arm is resiliently length-variable responsive to application of a longitudinal extension force on the coupling assembly arm; and wherein the coupling assembly arm comprises an arm housing having an outer housing wall, an inner housing wall telescopically extendable from the outer housing wall, an arm cylinder in the arm housing and an arm piston extendable from the arm cylinder and engaging the inner housing wall, the wheel engagement member carried by the inner housing wall.

16. A vehicle coupling assembly for facilitating a resilient coupling between a rear vehicle and a vehicle wheel on a front vehicle, comprising:

a coupling assembly arm;

a wheel engagement member including an engagement member body rotatably carried by the coupling assembly arm, the engagement member body suitably sized and configured for engagement with the vehicle wheel on the front vehicle in substantially concentric relationship with respect to the vehicle wheel;

wherein the coupling assembly arm is resiliently length-variable responsive to application of a longitudinal extension force on the coupling assembly arm; and wherein the coupling assembly arm comprises an arm housing having an outer housing wall, an inner housing wall telescopically extendable from the outer housing wall, at least one pair of aligned outer arm pin openings in the outer housing wall, a pair of aligned inner arm pin openings in the inner housing wall, and a frangible arm retainer pin extending through the outer arm pin openings and inner arm pin openings to normally retain the arm housing in an extended position with respect to the arm housing.

17. A vehicle coupling assembly for facilitating a resilient coupling between a rear vehicle and a vehicle wheel on a front vehicle, comprising:

a coupling assembly arm;

a wheel engagement member including an engagement member body rotatably carried by the coupling assembly arm, the engagement member body suitably sized and configured for engagement with the vehicle wheel on the front vehicle in substantially concentric relationship with respect to the vehicle wheel;

wherein the engagement member body of the wheel engagement member comprises an outer engagement member surface, an inner engagement member surface and a side engagement member surface extending from the outer engagement member surface to the inner engagement member surface; and wherein the side engagement member surface of the engagement member body has a beveled cross-sectional contour or profile and tapers from the outer engagement member surface to the inner engagement member surface.

18. A vehicle coupling assembly for facilitating a resilient coupling between a rear vehicle and a vehicle wheel on a front vehicle, comprising:

a coupling assembly arm;

a wheel engagement member including an engagement member body rotatably carried by the coupling assembly arm, the engagement member body suitably sized and configured for engagement with the vehicle wheel on the front vehicle in substantially concentric relationship with respect to the vehicle wheel;

wherein the engagement member body of the wheel engagement member comprises an outer engagement member surface, an inner engagement member surface and a side engagement member surface extending from the outer engagement member surface to the inner engagement member surface; and a wheel hub cavity in the inner engagement member surface of the engagement member body.

* * * * *